United States Patent
Cabrera et al.

(10) Patent No.: US 9,134,980 B1
(45) Date of Patent: Sep. 15, 2015

(54) COMPILER OPTIMIZATION IN A COMPUTING ENVIRONMENT

(75) Inventors: Luis Felipe Cabrera, Bellevue, WA (US); Eric Jason Brandwine, Haymarket, VA (US); James R. Hamilton, Seattle, WA (US); Jonathan A. Jenkins, Seattle, WA (US); Matthew D. Klein, Seattle, WA (US); Nathan Thomas, Seattle, WA (US); Pradeep Vincent, Kenmore, WA (US)

(73) Assignee: Amazon Technologies, Inc., Reno, NV (US)

( * ) Notice: Subject to any disclaimer, the term of this patent is extended or adjusted under 35 U.S.C. 154(b) by 149 days.

(21) Appl. No.: 13/461,058

(22) Filed: May 1, 2012

(51) Int. Cl.
*G06F 9/45* (2006.01)
*G06F 12/08* (2006.01)

(52) U.S. Cl.
CPC .. G06F 8/48 (2013.01); G06F 8/41 (2013.01); *G06F 8/443* (2013.01); *G06F 12/0822* (2013.01); *G06F 12/0831* (2013.01); *G06F 12/0875* (2013.01); *G06F 12/0888* (2013.01)

(58) Field of Classification Search
CPC .......... G06F 8/41; G06F 8/4441; G06F 8/443
See application file for complete search history.

(56) References Cited

U.S. PATENT DOCUMENTS

| | | | | |
|---|---|---|---|---|
| 5,822,749 A | * | 10/1998 | Agarwal | 1/1 |
| 5,861,044 A | * | 1/1999 | Crenshaw | 8/115 |
| 7,558,919 B1 | * | 7/2009 | Yochai et al. | 711/129 |
| 8,561,043 B2 | * | 10/2013 | Ayguade et al. | 717/151 |
| 8,561,044 B2 | * | 10/2013 | Chen et al. | 717/151 |
| 2004/0054992 A1 | * | 3/2004 | Nair et al. | 717/138 |
| 2004/0199907 A1 | * | 10/2004 | Motokawa et al. | 717/140 |
| 2005/0086653 A1 | * | 4/2005 | Heishi et al. | 717/151 |
| 2005/0235107 A1 | * | 10/2005 | Ohno et al. | 711/112 |
| 2006/0026575 A1 | * | 2/2006 | Cabillic et al. | 717/140 |
| 2007/0226698 A1 | * | 9/2007 | Cascaval et al. | 717/127 |
| 2007/0240117 A1 | * | 10/2007 | Wiles et al. | 717/124 |
| 2009/0248985 A1 | * | 10/2009 | Ayguade et al. | 711/125 |
| 2009/0249318 A1 | * | 10/2009 | Ayguade et al. | 717/151 |
| 2011/0202907 A1 | * | 8/2011 | Dice et al. | 717/148 |
| 2012/0254846 A1 | * | 10/2012 | Moir et al. | 717/152 |
| 2013/0086564 A1 | * | 4/2013 | Felch | 717/145 |

\* cited by examiner

*Primary Examiner* — Lewis A Bullock, Jr.
*Assistant Examiner* — Tina Huynh
(74) *Attorney, Agent, or Firm* — Hogan Lovells US LLP (57) ABSTRACT

A set of techniques is described for enabling profile-driven compiler optimization based on cloud-specific information. A service provider may host applications on behalf of multiple users by providing a set of shared resources in a multi-tenant computing environment, where the resources are shared by the various applications hosted thereon. The service provider can collect runtime conditions, resource contention data and other environment-specific information of the shared resources. This gathered information can be provided a profile-driven compiler. The profile-driven compiler can use the information to recompile the source code of the application to produce an optimized version the application that is specifically tuned to run on the shared resources. The running version of the application can then be replaced by the optimized version.

16 Claims, 8 Drawing Sheets

COMPILER OPTIMIZATION IN A COMPUTING ENVIRONMENT

BACKGROUND

As an ever increasing number of applications and services are being made available over networks such as the Internet, a number of content, application, and/or service providers are turning to technologies such as remote resource sharing and cloud computing. Cloud computing is a general term often used to describe the process of providing access to electronic resources through services, such as Web services, where the hardware and/or software used to support those services is made to be dynamically scalable to meet the needs of the services at any given time. A user or customer typically will rent, lease, or otherwise pay for access to resources through the cloud, and thus does not have to purchase and maintain the hardware and/or software to provide access to these resources. A service provider that owns those resources will usually take on the responsibility of maintaining and managing the resources, ensuring that they are highly available, scalable and otherwise ready to provide the necessary services.

In such cloud environments, multiple users often share resources such as remote server and storage devices. For example, an application owner may wish to deploy its application in the cloud by running the application on the resources of the service provider and enabling the masses of end users to concurrently send multiple requests to be executed against those resources. Certain concerns can arise, however, when multiple applications and services begin contending for the same resources of the service provider, such as hardware resources, software resources or some combination thereof. Because the creators of the applications may not have foreseen such resource contentions at the time of developing and compiling the application, most applications are not optimized for performance in light of such resource contention or other cloud-specific information.

BRIEF DESCRIPTION OF THE DRAWINGS

Various embodiments in accordance with the present disclosure will be described with reference to the drawings, in which.

DETAILED DESCRIPTION

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with the embodiments described herein overcome the various deficiencies in existing approaches for developing and executing software applications and services. In particular, various embodiments provide approaches for providing cloud-specific information to compilers and optimizing compilation of applications for execution on shared resources in a multi-tenant computing environment (e.g. "cloud environment").

In accordance with various embodiments, a service provider system or service can utilize profile-driven compilation and optimization based at least in part on information specific to the multi-tenant computing environment and the shared resources located therein (e.g. "cloud-specific" information). In accordance with an embodiment, a service provider can execute and host applications on behalf of a user on the service provider's resources, which can include a combination of both hardware and software resources. The service provider can be any entity that provides a set of resources in a multi-tenant computing environment, where those resources will be shared by multiple applications owned by multiple users. In accordance with an embodiment, once the application is deployed, the service provider can gather a set of runtime environment information associated with the set of shared resources in the multi-tenant computing environment. This environment-specific information can include but is not limited to any cache data associated with caches that are shared by the application and other applications, resource contention data about the applications that are contending for the shared resources, data about the computing capacity or bandwidth of servers being used to execute the application, and any other relevant data that is specific to the shared resources of the multi-tenant environment. In alternative embodiments, the environment-specific data can be static and may be collected before deploying or executing the application.

In accordance with an embodiment, once the runtime environment data has been gathered, the data can be provided to a profile-driven compiler. The compiler can use the collected data to determine how to recompile the source code of the application in order to produce a new executable version of the application that is "optimized" for the shared resource computing environment. The "optimized" version can provide improved performance in at least one metric or parameter under current environment conditions. The recompiling can be based at least in part on the shared resource information that has been gathered by the service provider. For example, the compiler may modify the instructions of the executable file to take into consideration the available storage space in the cache that will be shared between the application and other applications running on the same resources. Alternatively, the compiler may modify the executable instructions based on the available bandwidth on the particular server that will be executing the application. As another example, the compiler may optimize the compilation based on the resource contention data that indicates which applications are contending for certain resources (e.g. motherboard, CPU, memory, etc.) in the multi-tenant computing environment.

In accordance with an embodiment, once the source code of the application has been recompiled, the running version can be replaced with the new version that has been optimized for the shared resource computing environment. In one embodiment, this can be performed in-flight, by routing all new incoming requests to the new optimized version and allowing the older version to finish processing its requests before decommissioning or suspending the older version.

In accordance with various embodiments, the service provider can maintain a plurality of precompiled (or recompiled) executable versions of the application and switch between those versions based at least in part on the runtime conditions of the shared resources in the multi-tenant computing environment. For example, one version of the application may be specifically tuned to utilize a large amount of available cache, while a different version may be optimized to use a smaller cache. In accordance with an embodiment, the service provider can utilize an optimization engine that monitors the shared resource data and detects when the available cache on the shared resources is above a threshold level. When the amount of available cache has risen above the threshold, the optimization engine can deploy the version of the application optimized for large cache storage. Thereafter, when the amount of available cache has dropped below a designated threshold, the optimization engine may replace the application with the version that has been tuned for lower amount of cache storage. In a similar fashion, the optimization engine can replace the application versions based on other shared resource environment information, such as resource contention data, hardware utilization data, bandwidth and the like.

Figure 1:
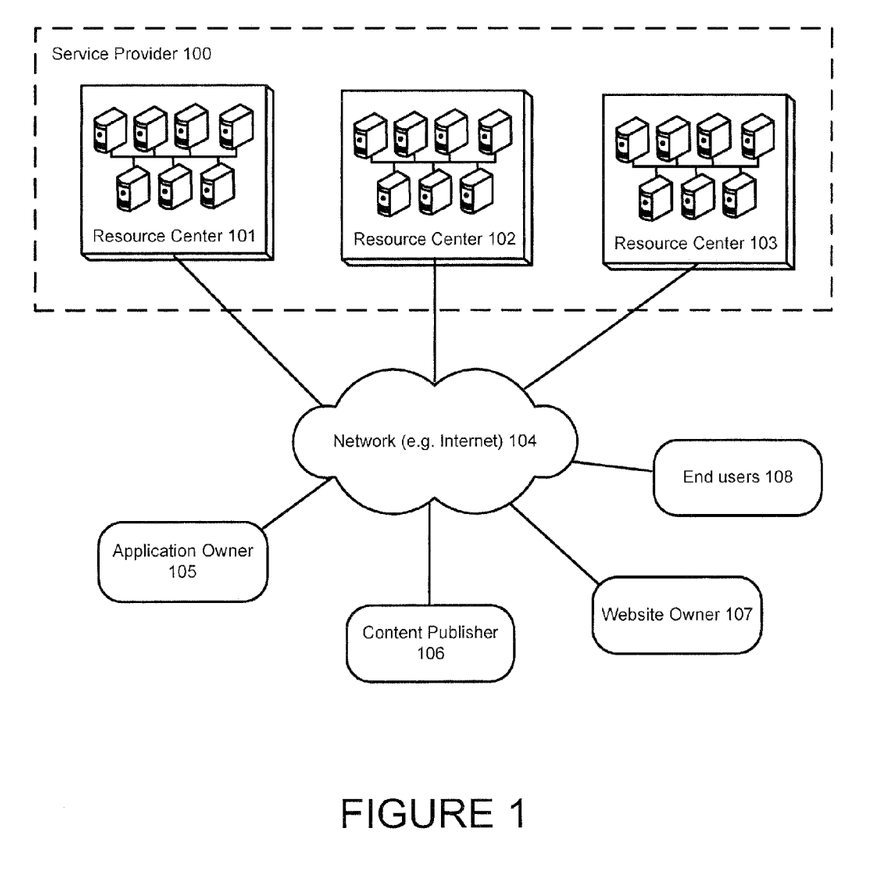
FIG. 1 is a general illustration of a service provider environment, in accordance with various embodiments.

FIG. 1 is a general illustration of a service provider environment, in accordance with various embodiments.

As illustrated, a service provider 100 can offer to its customers a multi-tenant computing environment comprised of shared computing resources, such as physical servers/computers, virtual machines, raw (block) storage devices, firewalls, load balancers, networking equipment and a wide variety of other resources. In accordance with an embodiment, the service provider 100 can supply these shared resources on demand from its large pools installed in one or more resource centers (101, 102, 103). For wide area connectivity, a network (e.g. Internet) 104 can be used to connect and expose those resources to various users.

In accordance with an embodiment, a customer of the service provider, such as an application owner 105, content publisher 106, or website owner 107 may deploy and run their service(s) on the shared resources (e.g. servers, etc.) of the service provider 100. For example, the application owner 105 may install its operating system images as well as its application software on the physical machines located in one or more data centers of the service provider 100. In this embodiment, the customer may be responsible for maintaining the operating systems and application software. The service provider may bill on a utility computing basis, wherein the cost to the customer reflects the amount of resources consumed by the customer's particular application.

In accordance with various embodiments, the resource centers (101, 102, 103) may be provided by the service provider 100 or alternatively by one or more parties associated with the provider 100 (e.g. entities having a business relationship with the service provider). The various resource centers can include resources of the same or similar type or of different types. In accordance with an embodiment, the number of resources and/or resource centers can be scaled as necessary to support all of the customers and users of the service provider.

In accordance with various embodiments, the data centers (101, 102, 103) of the service provider can be distributed in several geographical regions and availability zones for purposes of lower latency and high availability. By way of example, availability zones can be distinct locations that are engineered to be insulated from failures in other availability zones and provide inexpensive, low latency network connectivity to other availability zones in the same region. By launching instances in separate availability zones, applications can be protected from failure of a single location. Regions may include one or more availability zones and may be geographically dispersed, and located in separate geographic areas or countries. For example, regions may include United States (US) East (Northern Virginia), US West (Oregon), US West (Northern California), EU (Ireland), Asia Pacific (Singapore), Asia Pacific (Tokyo), South America (Sao Paulo) and the like.

Figure 2:
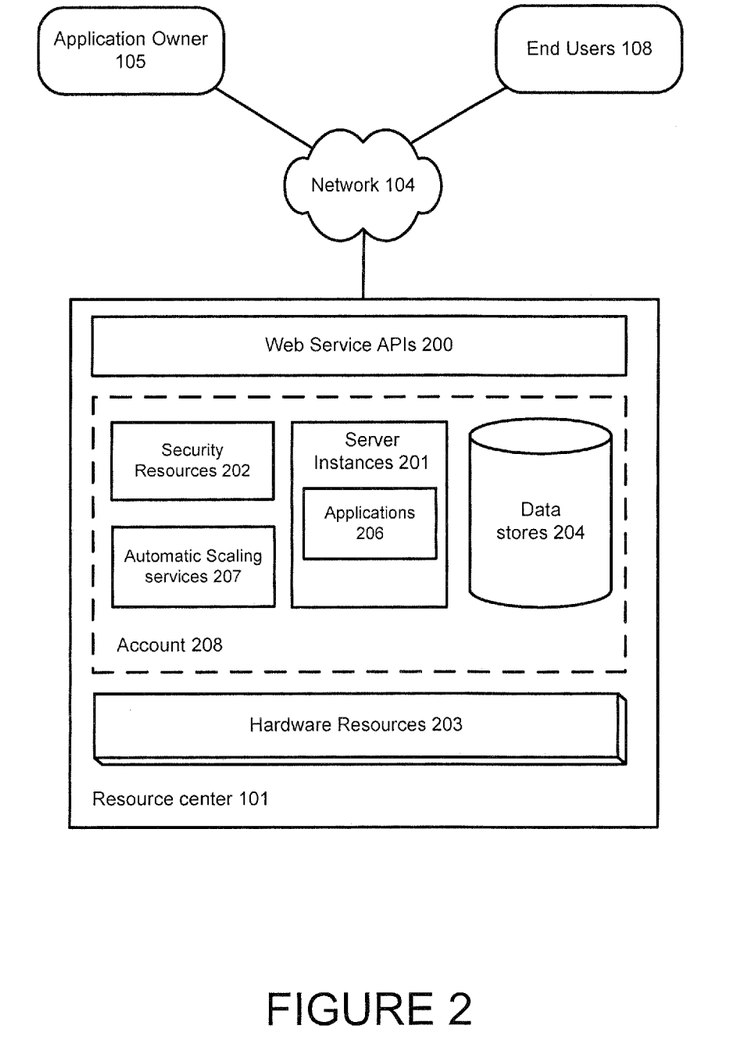
FIG. 2 is an illustration of various resources that can be provided by a service provider, in accordance with various embodiments.

FIG. 2 is an illustration of various resources that can be provided by a service provider, in accordance with various embodiments. As illustrated, the shared resources of the resource center 101 may include a set of physical hardware devices 203, including but not limited to computer servers, hubs, switches, bridges, racks, firewalls and other network devices. These devices are used to deploy and execute the applications 206 and services on behalf of various users (e.g. application owners 105) and to enable these applications to be made available to end users 108 on a mass scale.

The service provider 100 can supply a set of web service application programming interfaces (APIs) 200 that can be used by the application owner 105 to manage their applications and the resources being used to run the applications. The APIs 200 can provide resizable compute capacity (e.g. server capacity) on the network. For example, an application owner 105 can bundle the operating system, application software and associated configuration settings into a machine image. These machine images can then be used to provision one or more virtualized server instances 201 which will run the customer's applications 206. Additionally, the server instances 201 can be decommissioned using simple web service calls to scale capacity up and down quickly, as the capacity requirements of each application change. In certain embodiments, an automatic scaling service 207 can be configured to manage the scaling needs of the application, automatically provisioning additional server instances when the workload of the application increases and removing server instances when workload decreases.

In accordance with one embodiment, each of the server instances 201 is a virtual server instance assigned as a unit of compute capacity to the application owner 105 and used by the service provider to measure the hardware resource 203 consumption. In accordance with alternative embodiments, the server instances 201 may be the actual physical devices that run the applications 206 on behalf of the customer.

In various embodiments, the service provider 100 may provide server instances 201 on a per-hour charging basis, for one-time payment or create a market place for customers hid for unused capacity of the various server instances. Instances 201 can be launched in one or more geographical regions. Each region may have multiple availability zones which are distinct locations that are engineered to be insulated from failures in other availability zones.

In accordance with an embodiment, each server instance 201 may be assigned a role at boot time. For example, an instance can be designated a database server, an application server, a slave server and the like. The role may be passed in as an argument during launch that instructs the server instance to perform a sequence of steps after it has booted. On boot, a server instance can retrieve the necessary resources (e.g. code, scripts, configuration, etc.) based on the role assigned to it and the instance can attach itself to a cluster to serve its Function (e.g. execute the application).

In accordance with an embodiment, each application owner 105 can be assigned an account 208 by the service provider. The account 208 can contain all of the resources utilized by the application owner, including server instances 201, data stores 204 (e.g. databases, content management systems, etc.), security resources 202 (e.g. policies, groups, user identities, etc.), scaling services 207 and the like. The account can be a secured account, wherein access to it is controlled and restricted to a selected group of users that may access and manipulate the various resources of the account.

Figure 3:
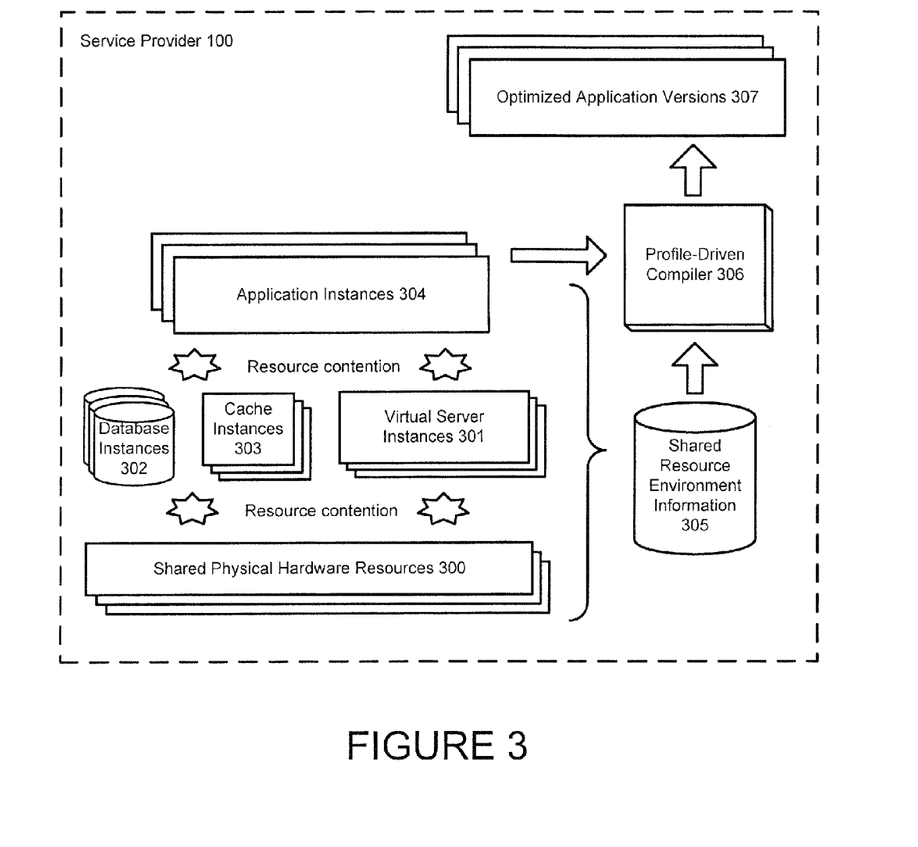
FIG. 3 illustrates an example of optimizing a compiler with information specific to a shared resource multi-tenant computing environment, in accordance with various embodiments.

FIG. 3 illustrates an example of optimizing a compiler with information specific to a shared resource multi-tenant computing environment, in accordance with various embodiments.

In the illustrated embodiment, the multi-tenant computing environment provided by the service provider 100 includes a number of physical hardware resources 300. These physical resources may be shared by large numbers of users' applications 304 that are being hosted by the service provider 100. In addition, the computing environment may include a number of virtual servers 301, cache instances 303, database instances 302 and other software or virtual resources that may serve as middleware between the applications 304 and the physical hardware 300 running those applications.

In accordance with various embodiments, the service provider may continuously gather information 305 that is specific to the shared resource computing environment. Given the nature of the multi-tenant computing environment, various resource contentions may occur between the numerous components running on the system. For example, multiple applications running on the same server device may be simultaneously trying to utilize large amounts of cache memory on that server. This may cause the amount of cache actually available to a particular application to be less than expected by the owner of that application. Similarly, depending on the amount of network traffic and connections being utilized by the hosted applications, one server may have significantly less bandwidth than another server. Moreover, some of the servers may utilize hardware that is different from other servers, some servers may host larger (or smaller) number of applications than other servers, some applications may be more CPU intensive, while other applications may utilize more memory and so on. Much of this environmental data may be relevant to the performance of the application. In various embodiments, the data can be static or dynamic. For example, the resource contention data may be considered dynamic since depending on the executing applications, it may vary significantly at runtime. Other data, such as the type of hardware utilized by a particular server may be viewed as more static, as it does not vary with time.

In accordance with an embodiment, the service provider 100 can utilize a service that continuously (or periodically) collects this environment-specific data 305, manages and analyzes the data for a variety of purposes. In one embodiment, the data 305 can be provided to a profile-driven compiler, in order to improve the optimization of the various application instances running in the environment.

In accordance with an embodiment, the profile-driven compiler 306 can apply the gathered environment-specific information 305 to optimize the executable instructions of the application for the shared resources in the multi-tenant environment. Profile-driven compilers are aim to improve application runtime performance by using the results of actual executed tests of the program to optimize the final executable code. The compiler may access data (e.g. runtime trace information) from a sample execution of the application. The data may indicate which portions of the application are executed more or less frequently than other portions and the like. This data can be useful for the compiler in branch prediction and other code optimization. For example, if the environment-specific data indicates that there is limited memory space for the application cache due to multiple applications utilizing the memory of the server, the compiler may recompile the application to optimize it for less cache memory. Conversely, if the data 305 indicates that there is an abundant amount of memory on the device that will be used to execute the application, the compiler may optimize the executable instructions to access the cache more frequently.

In accordance with an embodiment, the compiler 306 may periodically (or continuously) recompile the various applications 304 to produce optimized versions 307 that are tuned to execute on the shared resources in the multi-tenant environment. In alternative embodiments, recompiling the application can include recompiling the interpreter or tune the runtime environment (e.g. Java runtime environment) or perform other compiler-based modifications to the application in order to produce one or more optimized versions of the application. An interpreter can be any application or computer program that executes instructions either directly or by first translating them into an intermediate representation. In various embodiments, once the optimized versions have been compiled, the optimized versions 307 can be switched and replaced at runtime depending on the runtime data specific to the multi-tenant computing environment.

It should be noted that although the profile-driven compiler 306 is illustrated as being located on the service provider 100 system, this is not a limitation to all of the embodiments described herein. In various alternative embodiments, the compiler may be located in a different location or a different system (e.g. application owner system, etc.), wherein the service provider may provide the collected runtime information to the remote compiler so that the application can be optimized and recompiled at the remote location.

Figure 4:
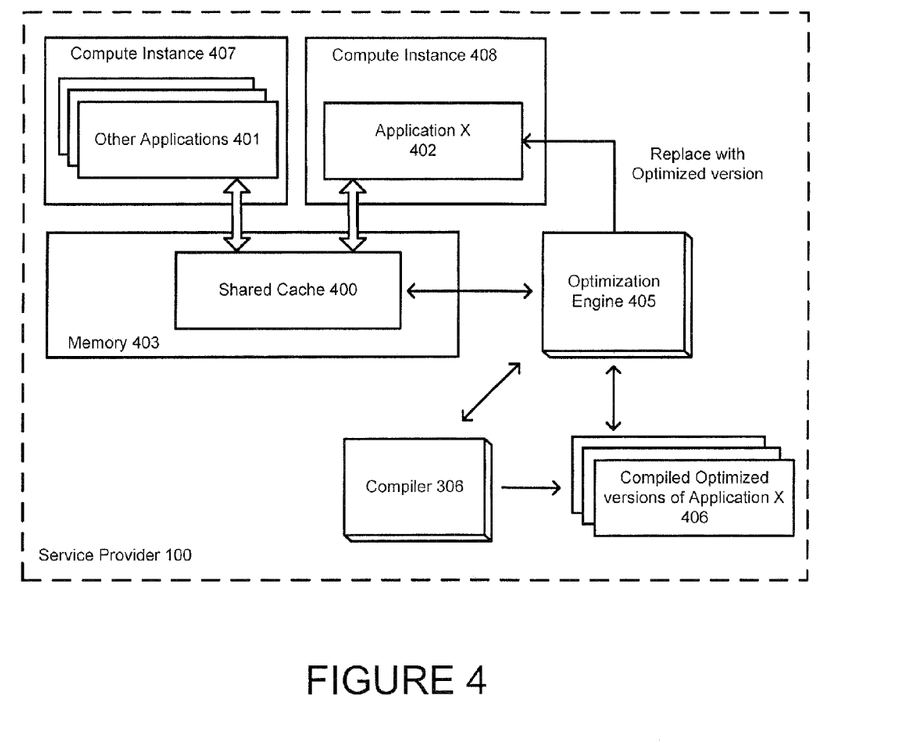
FIG. 4 is an example illustration of using optimized application versions in a shared cache environment, in accordance with various embodiments.

FIG. 4 is an example illustration of using optimized application versions in a shared cache environment, in accordance with various embodiments.

In the illustrated embodiment, a shared cache 400 is shown that is being accessed by application X 402. The cache 400 is being shared by a plurality of other applications 401. The application X 400 may be running on compute instance 407, while the other applications 401 are running on one or more different compute instances 408. Because in some embodiments, these compute instances are separate and individual virtual machines running in a service provider environment (e.g. cloud computing environment), the amount of cache that is actually available to them may not always be known with certainty to the applications. For example, compute instance 408 may not have any knowledge or information about the amount of cache being utilized by applications running on compute instance 407. In addition, the number of applications 401 sharing the cache may be volatile, and the amount of actual cache space available to application 402 may be greater or less than the amount of expected cache space. As previously mentioned, this information about the actual available cache storage (along with other environment-specific data) can be communicated to the compiler 306, which can use the information to optimize applications for the runtime multi-tenant environment of the service provider 100.

In accordance with an embodiment, the compiler 306 can recompile application X to produce one or more optimized versions 406 of the application. Each version may be specifically tuned for a set of particular runtime conditions associated with the shared resources, such as shared cache 400. In accordance with an embodiment, an optimization engine 405 may be monitoring these runtime conditions (e.g. available cache memory) of the shared cache 400 and dynamically replace the running version of the application X 402 with a different version that is more optimized for the current conditions. For example, if the amount of cache memory available to the application reaches a level above a predefined threshold, the optimization engine 405 can dynamically replace the running version of the application with a version optimized to utilize a larger cache. Subsequently, when the available cache drops below another predefined threshold, the optimization engine 405 can replace that version with another version of the application that is specifically optimized to utilize a smaller cache. In various embodiments, the thresholds can be made to be configurable by an administrator or other technician.

It should be noted that while this illustrated example refers to the availability of shared cache memory, the embodiments describe throughout this disclosure are not limited to cache data. In accordance with various embodiments, any information that is associated with the shared resources in a multi-tenant computing environment can be utilized with the optimization techniques describe herein. For example, the optimization engine 405 may dynamically switch the application versions based on resource contention data, available bandwidth or network connections, CPU or GPU usage, time of day, memory latency, network traffic, and the like.

Figure 5:
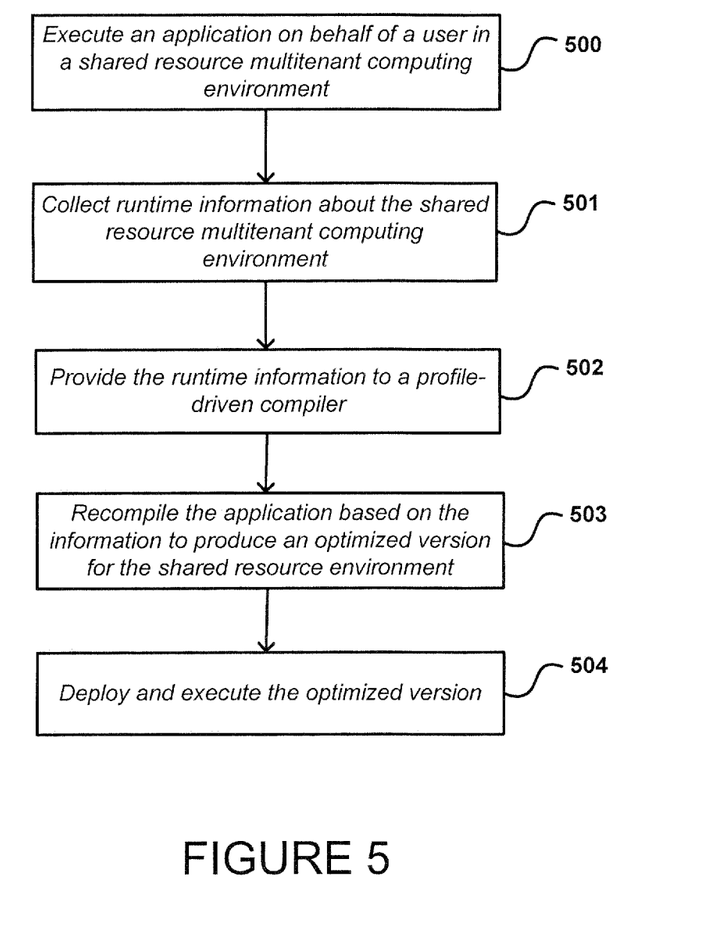
FIG. 5 illustrates an example process for optimizing compilation of applications based on shared resource multi-tenant environment information, in accordance with various embodiments.

FIG. 5 illustrates an example process for optimizing compilation of applications based on shared resource multi-tenant environment information, in accordance with various embodiments. Although this figure, as well as any other process illustrations contained in this disclosure may depict functional operations in a particular sequence, the processes are not necessarily limited to the particular order or operations illustrated. One skilled in the art will appreciate that the various operations portrayed in this or other figures can be changed, rearranged, performed in parallel or adapted in various ways. Furthermore, it is to be understood that certain operations or sequences of operations can be added to or omitted from the process, without departing from the scope of the various embodiments. In addition, it should be understood that the process illustrations contained herein are intended to demonstrate an idea of the process flow to one of ordinary skill in the art, rather than specifying the actual sequences of code execution, which may be implemented as different flows or sequences, optimized for performance, or otherwise modified in various ways.

In operation 500, the service provider executes an application on behalf of a user. In accordance with an embodiment, the application is executed using a set of shared resources in a multi-tenant computing environment. The resources can be shared by multiple other applications that are being hosted on behalf of the same and/or other users. In various embodiments, the shared resources may include hardware resources such as computing devices, motherboards, CPUs, memory, etc. as well as software or virtual resources, such as application servers, web servers, database instances, messaging services and the like.

In operation 501, the service provider collects runtime information about the set of shared resources in the multi-tenant computing environment. In accordance with an embodiment, the information can be any environment-specific data that may include shared cache data, resource contention data, data about the computing capacity or bandwidth of servers being used to execute the application, and any other relevant data that is specific to the shared resources of the multi-tenant computing environment. In various embodiments, the environment-specific data may be static, dynamic or a combination thereof.

In operation 502, the collected environment-specific data is provided to a profile-driven compiler. In accordance with an embodiment, the compiler can use the information during compilation in order to better optimize the executable applications, specifically for the shared resources and the multi-tenant computing environment.

In operation 503, the profile-driven compiler compiles the source code of the application to produce a new version the application. The compilation is performed using the environment-specific information gathered by the service provider. In accordance with an embodiment, the newly compiled (or recompiled) version is optimized to be executed specifically on the shared resources of the multi-tenant computing environment based on the runtime conditions occurring in the environment.

In operation 504, the new version of the application can be deployed and executed in the multi-tenant computing environment. In accordance with an embodiment, the currently running version of the application is replaced dynamically with the new recompiled and optimized version. This can be performed by routing all new requests to the new version of the application and allowing the older version of the application to finish processing the requests before taking it offline.

Figure 6:
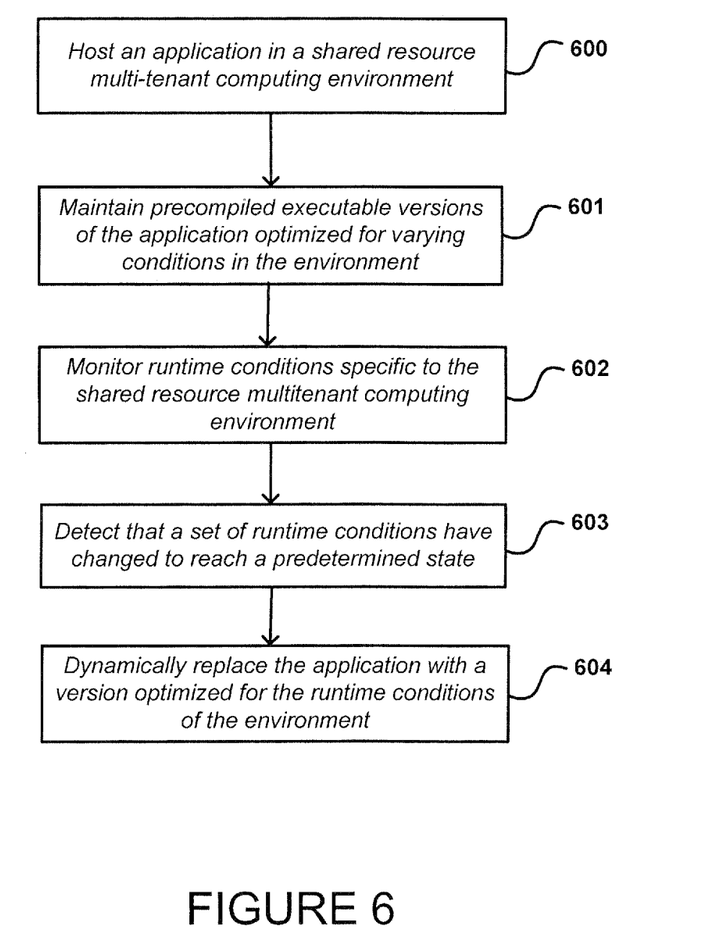
FIG. 6 is an example process for monitoring the runtime environment and dynamically replacing a running application with an optimized version of the application, in accordance with various embodiments.

FIG. 6 is an example process for monitoring the runtime environment and dynamically replacing a running application with an optimized version of the application, in accordance with various embodiments.

In operation 600, the service provider hosts an application on a set of resources in a multi-tenant computing environment. The resources may also be shared by other applications hosted on behalf of other users.

In operation 601, the service provider maintains a number of precompiled (or recompiled) executable versions of the application. Each version of the application may be optimized for a set of specific runtime conditions of the multi-tenant environment. For example, one version may be specifically optimized to be executed when application contention for the various resources is high, while another version may be optimized for low resource contention conditions.

In operation 602, the service provider may implement an optimization engine (or other module) that continuously monitors the changing runtime conditions of the multi-tenant computing environment. For example, the optimization engine may periodically check the size of available cache that can be utilized by the applications running on the shared resources. Alternatively, the optimization engine may periodically determine how many applications are contending for hardware resources on a particular server, how many open network connections the server has, or any other relevant environment information.

In operation 603, the optimization engine may detect that the runtime conditions have reached a particular predetermined state. For example, the optimization engine may determine that the amount of available cache available on a particular computing device has dropped under a specific threshold. The particular state of runtime conditions may have an associated version of the application that has been specifically recompiled and optimized for those runtime conditions.

In operation 604, the optimization engine may dynamically replace the running version of the application with the version that has been optimized for the runtime conditions. For example, if the runtime conditions indicate that the amount of available cache has dropped beneath a specific threshold, the application may be replaced with a version that has been specifically tuned to utilize a smaller cache. Conversely, if the runtime conditions indicate that the available cache has risen above another threshold, the optimization engine can replace the application with a version that is optimized to use a large cache. In accordance with an embodiment, the application can be replaced with the optimized version in-flight, as previously described, in order to prevent any disruption to the services being provided by the application.

Figure 7:
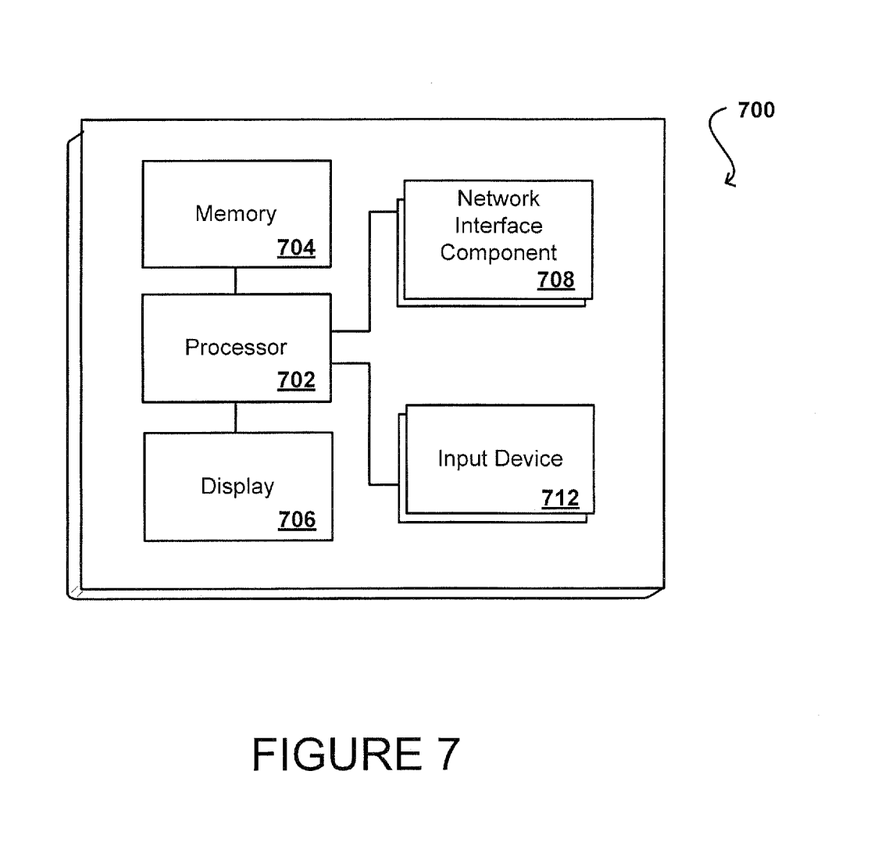
FIG. 7 illustrates a logical arrangement of a set of general components of an example computing device that can be utilized in accordance with various embodiments.

FIG. 7 illustrates a logical arrangement of a set of general components of an example computing device 700. In this example, the device includes a processor 702 for executing instructions that can be stored in a memory device or element 704. As would be apparent to one of ordinary skill in the art, the device can include many types of memory, data storage, or non-transitory computer-readable storage media, such as a first data storage for program instructions for execution by the processor 702, a separate storage for images or data, a removable memory for sharing information with other devices, etc. The device typically will include some type of display element 706, such as a touch screen or liquid crystal display (LCD), although devices such as portable media players might convey information via other means, such as through audio speakers. As discussed, the device in many embodiments will include at least one input element 708 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 700 of FIG. 7 can include one or more network interface elements 708 for communicating over various networks, such as a Wi-Fi, Bluetooth, RF, wired, or wireless communication systems. The device in many embodiments can communicate with a network, such as the Internet, and may be able to communicate with other such devices.

Figure 8:
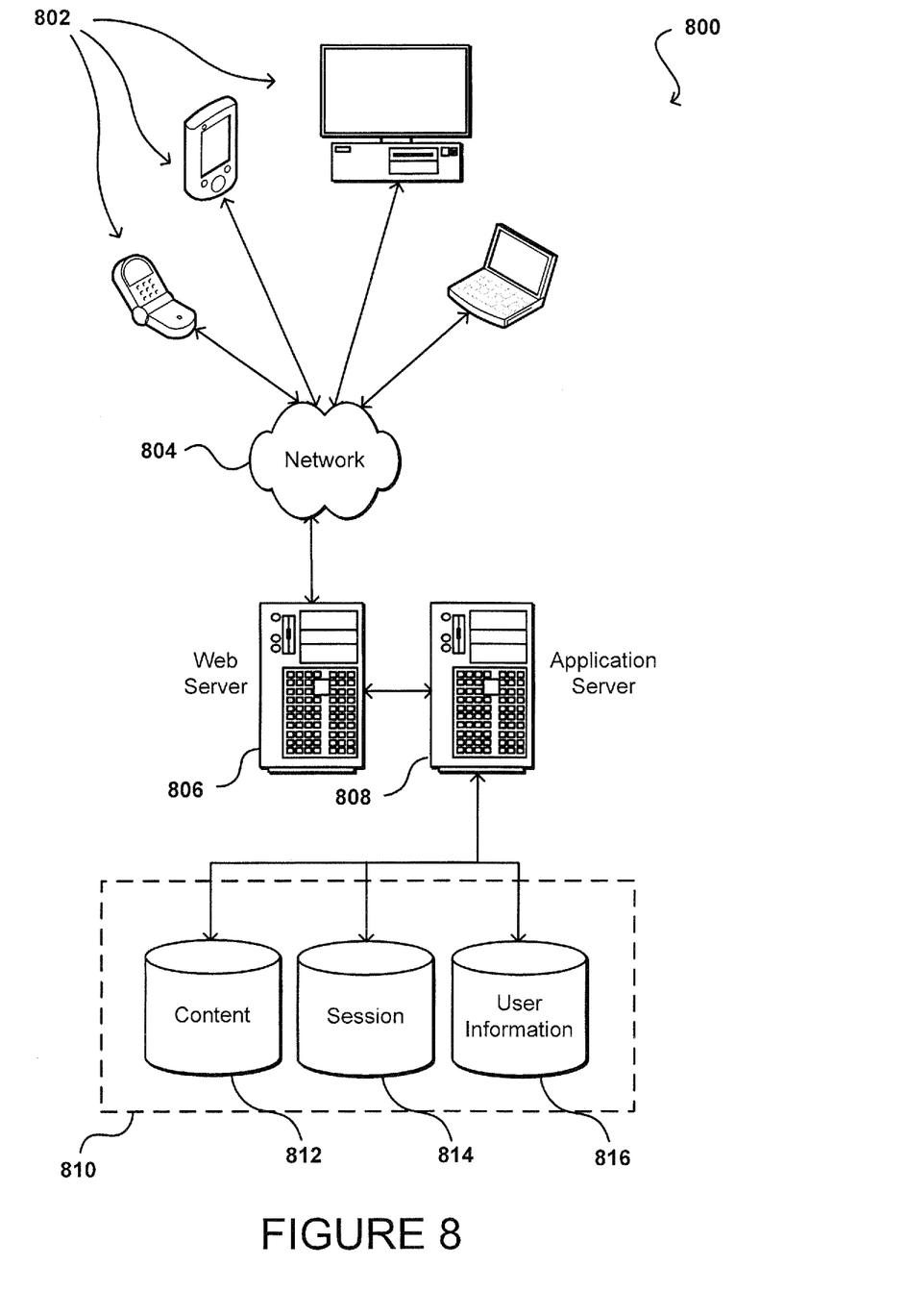
FIG. 8 illustrates an example of an environment for implementing aspects in accordance with various embodiments.

As discussed, different approaches can be implemented in various environments in accordance with the described embodiments. For example, FIG. 8 illustrates an example of an environment 800 for implementing aspects in accordance with various embodiments. As will be appreciated, although a Web-based environment is used for purposes of explanation, different environments may be used, as appropriate, to implement various embodiments. The system includes an electronic client device 802, which can include any appropriate device operable to send and receive requests, messages or information over an appropriate network 804 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 806 for receiving requests and serving content in response thereto, although for other networks an alternative device serving a similar purpose could be used, as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 802 and the application server 808, can be handled by the Web server 806. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing production data 812 and user information 816, which can be used to serve content for the production side. The data store also is shown to include a mechanism for storing log or session data 814. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer implemented method for optimizing compilers, said method comprising:
    under the control of one or more computer systems configured with executable instructions,
    executing a user application on behalf of at least one user, the user application being executed using a set of shared resources in a multi-tenant computing environment, the set of shared resources also executing a plurality of other applications on behalf of one or more other users;

collecting runtime information for the set of shared resources in the multi-tenant computing environment, the runtime information including at least data associated with a cache that is shared between the user application and at least one of the plurality of other applications, the data indicating that an available amount of cache space of a first cache on a computing device is below a threshold amount of cache space;

providing the collected runtime information to a profile-driven compiler;

recompiling source code of the user application by the profile-driven compiler based at least in part on the runtime information in order to produce an optimized version of the user application, the optimized version having at least one improved performance parameter when being executed on the set of shared resources, the at least one improved performance parameter including using a second cache with a size less than the first cache; and executing the optimized version of the user application on the set of shared resources in the multi-tenant computing environment.

2. The method of claim 1, wherein the runtime information for the set of shared resources further includes:

resource contention data that indicates whether at least one of the plurality of other applications are contending for one or more of: a motherboard, a central processing unit (CPU), or memory on the set of shared resources being used to execute the user application.

3. The method of claim 1, wherein the runtime information for the set of shared resources further includes:

data indicating a size of a server instance being used to execute the user application or data indicating available bandwidth on the server instance being used to execute the user application.

4. The method of claim 1, wherein recompiling source code of the user application by the compiler to produce the optimized version the user application further includes:

modifying the optimized version of the user application to account for available storage space in the cache that is shared between the user application executing on a first compute instance and at least one of the plurality of other applications, the plurality of other applications executing on a second compute instance.

5. The method of claim 1, wherein the runtime information for the set of shared resources further includes:

data indicating whether an application cache created by the user application will fit locally in memory of the computing device being used to execute the user application.

6. A computing system, comprising:

at least one processor; and memory including instructions that, when executed by the processor, cause the computing system to:

execute a user application on behalf of at least one user, the user application being executed using a set of shared resources in a multi-tenant computing environment, the set of shared resources also executing a plurality of other applications on behalf of one or more other users;

collect runtime information for the set of shared resources in the multi-tenant computing environment, the runtime information including at least data associated with a cache that is shared between the user application and at least one of the plurality of other applications, the data indicating that an available amount of cache space of a first cache on a computing device is below a threshold amount of cache space;

provide the collected runtime information to a profile-driven compiler;

recompile source code of the user application by the profile-driven compiler based at least in part on the runtime information in order to produce an optimized version of the user application, the optimized version having at least one improved performance parameter when being executed on the set of shared resources, the at least one improved performance parameter including using a second cache with a size less than the first cache; and execute the optimized version of the user application on the set of shared resources in the multi-tenant computing environment.

7. The computing system of claim 6, wherein the runtime information further includes:

resource contention data that indicates whether the plurality of other applications are contending for one or more of a motherboard, a central processing unit (CPU), or memory on the set of shared resources being used to execute the user application.

8. The computing system of claim 6, wherein the runtime information further includes:

data indicating a size of a server instance being used to execute the user application or data indicating available bandwidth on the server instance being used to execute the user application.

9. The computing system of claim 6, wherein the runtime information further includes:

data indicating whether an application cache created by the user application will fit locally in memory of the computing device being used to execute the user application.

10. The computing system of claim 6, wherein the optimized version of the user application has been recompiled by a profile-driven compiler to be specifically tuned for execution on the set of shared resources taking into account the runtime information.

11. A non-transitory computer readable storage medium storing one or more sequences of instructions executable by one or more processors to perform a set of operations comprising:

executing a user application on behalf of at least one user, the user application being executed using a set of shared resources in a multi-tenant computing environment, the set of shared resources also executing a plurality of other applications on behalf of one or more other users;

collecting runtime information for the set of shared resources in the multi-tenant computing environment, the runtime information including at least data associated with a cache that is shared between the user application and at least one of the plurality of other applications, the data indicating that an available amount of cache space of a first cache on a computing device is below a threshold amount of cache space;

providing the collected runtime information to a profile-driven compiler;

recompiling source code of the user application by the profile-driven compiler based at least in part on the runtime information in order to produce an optimized version of the user application, the optimized version having at least one improved performance parameter when being executed on the set of shared resources, the at least one improved performance parameter including using a second cache with a size less than the first cache; and executing the optimized version of the user application on the set of shared resources in the multi-tenant computing environment.

12. The non-transitory computer readable storage medium of claim 11, further comprising instructions for:

periodically recompiling the source code of the user application based on resource contention information that is dynamically changing at runtime of the user application.

13. The non-transitory computer readable storage medium of claim 12, further comprising instructions for:

maintaining a plurality of optimized versions of the user application produced by the profile-driven compiler based on the resource contention information.

14. The non-transitory computer readable storage medium of claim 13, further comprising instructions for:

monitoring the resource contention information over a period of time;

detecting that the resource contention information has reached a predetermined state; and dynamically replacing the user application with the optimized version of the user application that is selected based on the resource contention information.

15. The non-transitory computer readable storage medium of claim 11, wherein the runtime information for the set of shared resources further includes resource contention information that indicates whether the plurality of other applications are contending for one or more of: a motherboard, a central processing unit (CPU), or memory on the set of shared resources being used to execute the user application.

16. The non-transitory computer readable storage medium of claim 11, wherein the optimized version of the user application has been recompiled by the profile-driven compiler to be specifically tuned for execution on the set of shared resources taking into account the runtime information.

* * * * *